(12) United States Patent
Jasinski et al.

(10) Patent No.: US 7,751,083 B2
(45) Date of Patent: Jul. 6, 2010

(54) SCANNER METAMERISM CORRECTION

(75) Inventors: David W. Jasinski, Rochester, NY (US); Kevin E. Spaulding, Spencerport, NY (US); James A. Reczek, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 592 days.

(21) Appl. No.: 11/694,098

(22) Filed: Mar. 30, 2007

(65) Prior Publication Data

US 2008/0239334 A1 Oct. 2, 2008

(51) Int. Cl.
*H04N 1/60* (2006.01)
*H04N 1/00* (2006.01)
*H04N 1/46* (2006.01)
*G03F 3/08* (2006.01)
*G06K 9/00* (2006.01)
*G06K 9/40* (2006.01)

(52) U.S. Cl. .................. 358/1.9; 358/504; 358/518; 358/516; 358/520; 358/524; 358/528; 382/162; 382/167; 382/274

(58) Field of Classification Search .............. 358/504, 358/518, 1.9, 516, 520, 524, 528; 382/162, 382/167, 274; 345/589, 626, 628, 643; 715/833; 348/97, E9.009; 355/133, 77
See application file for complete search history.

(56) References Cited

U.S. PATENT DOCUMENTS

| 5,406,325 | A * | 4/1995 | Parulski et al. ............... 348/97 |
| 5,543,940 | A * | 8/1996 | Sherman .................... 358/518 |
| 5,818,975 | A * | 10/1998 | Goodwin et al. ............ 382/274 |
| 6,337,923 | B1 * | 1/2002 | Yoon et al. .................. 382/167 |
| 6,650,438 | B1 | 11/2003 | Kress et al. |
| 6,934,053 | B1 | 8/2005 | Mestha et al. |
| 6,961,461 | B2 | 11/2005 | MacKinnon et al. |
| 2007/0058224 | A1 * | 3/2007 | Kawamoto et al. ......... 358/518 |

* cited by examiner

*Primary Examiner*—Charlotte M Baker
(74) *Attorney, Agent, or Firm*—Raymond L. Owens

(57) ABSTRACT

A method for automatically compensating for scanner metamerism errors associated with scanning input images using a digital color image scanner, wherein the input images can be on a variety of different input media having colorants with different spectral characteristics, comprising scanning an input image on a digital color image scanner to produce a scanned image; determining one or more estimated color balance error values in a color balance parameter space by analyzing the scanned image using a color balance analysis algorithm; assigning an input medium from a set of possible input media for the scanned input image in response to the estimated color balance error values; selecting a scanner metamerism correction color transform associated with the assigned input medium; and applying the selected scanner metamerism correction color transform to the scanned image to produce a corrected image compensated for scanner metamerism errors.

18 Claims, 4 Drawing Sheets

SCANNER METAMERISM CORRECTION

FIELD OF THE INVENTION

The present invention relates to correcting for scanner metamerism errors introduced when scanning images on different input media having colorants with different spectral characteristics.

BACKGROUND OF THE INVENTION

Human eyes contain cones having three different spectral sensitivities, which is the basis of human color vision. Typical human cone spectral sensitivities are shown in FIG. 1, and are labeled $\rho$, $\gamma$ and $\beta$. It can be seen that the peak sensitivities for each of the different cone types occurs at different wavelengths of light. The $\beta$ cones are most sensitive to "blue" light of about 450 nm, whereas the $\gamma$ and $\rho$ cones have peak sensitivities at about 550 nm and 580 nm, respectively, covering the "green" and "red" portions of the spectrum. Objects of different colors are distinguished by having different spectral reflectances, and therefore will stimulate different relative responses in each of the different cone types. A key principal for understanding color vision is that any two objects that produce the same cone responses will be seen to have the same color. Color is typically measured by calculating the well-known CIE XYZ tristimulus values:

$$X = \int_{400}^{700} I(\lambda)R(\lambda)\bar{x}(\lambda)d\lambda \quad (1)$$
$$Y = \int_{400}^{700} I(\lambda)R(\lambda)\bar{y}(\lambda)d\lambda$$
$$Z = \int_{400}^{700} I(\lambda)R(\lambda)\bar{z}(\lambda)d\lambda$$

where $\lambda$ is the wavelength, $I(\lambda)$ is the spectral power of the light source, $R(\lambda)$ is the spectral reflectance of the object, and $\bar{x}(\lambda)$, $\bar{y}(\lambda)$ and $\bar{z}(\lambda)$ are the color matching functions, which are convenient linear combinations of the cone spectral sensitivity functions. Any two objects having the same XYZ values will appear to have the same color to a human observer.

Often it is desirable to be able to scan a color image to form a digital image that can be viewed, manipulated, printed or stored in a digital computer. Because of the tri-chromatic nature of human color vision, a digital color image scanner must fundamentally have three different types of color sensors in order to be able to infer the color of the original image. The three different types of color sensors are generally chosen to be sensitive to the red, green and blue regions of the visible spectrum.

A set of typical spectral sensitivities for a digital color image scanner are shown in FIG. 2. It can be seen that these spectral sensitivities differ substantially from those of the human vision system shown in FIG. 1. This fact gives rise to a phenomenon known as scanner metamerism errors. This occurs when two objects match when viewed by a human observer, but which do not match when they are scanned with the scanner. Consider the case when two images formed on different input media having colorants with different spectral characteristics, are scanned on a digital color image scanner. If both images contain an image region of neutral gray, which appear to be identical to the human eye, it would be desirable that the scanner would produce identical scanner code values for these image regions. However, it is commonly found that the two image regions can produce substantially different scanner code values. This occurs because the two neutral gray regions may have very different spectral properties as is illustrated in FIG. 3. Such pairs of colors that are different spectrally, but which appear to be the same visually are commonly called "metamaric colors."

Using well-known color management techniques, it is possible to relate the scanner RGB code values to the corresponding color as perceived by the human vision system. The perceived colors are commonly represented in color spaces such as the well-known CIE XYZ and CIELAB color spaces. However, since the way the scanner "sees" color is dependent on the spectral characteristics of the input media, the relationship between the scanner RGB code values and the perceived color will be different for different input media. Therefore if a color transform is created to map scanner RGB code values to corresponding CIELAB color values, this color transform will only be accurate for one particular input media. More specifically, different color transforms will generally be necessary for input images that are formed using different sets of colorants.

A flow diagram showing a typical color management process that can be used to transform scanner RGB images to a desired output color space associated with a particular output device is shown in FIG. 4. Scanner RGB color values 40 produced by a digital color image scanner are first transformed using a scanner input color profile 41, which relates the scanner RGB color values 40 to corresponding device-independent color values 42. The device-independent color values 42 will generally be in a color space such as CIELAB or CIE XYZ. The device-independent color values 42 are then transformed using an output device color profile 43 to produce output device color values 44 appropriate for displaying/printing the scanned image on the particular output device.

The scanner input color profile 41 is usually determined for one particular input media, which will be designated as the reference input media. As described earlier, if the scanner is used to scan input media using different colorants than the reference input media, the relationship between the scanner RGB color values 40 and the device independent color values 42 will generally be different. As a result, the scanner input color profile 41 will not produce accurate results. In some cases the inaccuracies can be very dramatic and quite objectionable.

For most applications, it is desirable to be able to scan different types of input media on a given digital color image scanner. Therefore, it is necessary to deal with any scanner metamerism errors that may be associated with a given scanner/input media combination. The simplest approach is to design the scanning system for a single reference input medium, and then to live with any errors that are introduced for other input media. However, in many cases this can be quite unsatisfying if the scanner metamerism errors are substantial.

An alternative solution is to determine different scanner input color profiles 41 for each different input medium. While this approach can provide very accurate color reproduction, it is necessary for the user to select the appropriate color transform for the input medium that is being scanned. This can result in a very confusing and cumbersome user interface.

This problem can be particularly awkward when designing an all-in-one printer having both a scanner and a printer in a single mechanism. For many applications, the most common type of image that will typically be scanned on such systems will be legacy photographs printed on a conventional photographic silver halide print medium. As a result, this is the medium for which the system designer would generally want to optimize the scanner color correction transform. However, another common input that would be scanned would be images printed on the associated printer in the all-in-one system. And frequently the colorants used on that printer will be significantly different than those of the conventional photographic silver halide print medium. If the spectral sensitivities of the scanner differ significantly from human color matching functions, the result will be unsatisfactory color reproduction when these images are scanned. This can provide a high level of dissatisfaction for the user since they will generally expect that the system should be able to produce a high quality copy of an image that was printed on that system.

SUMMARY OF THE INVENTION

It is an object of the present invention to compensate for scanner metamerism errors introduced when scanning a variety of different input media on a digital color image scanner.

These objects are achieved by a method for compensating for scanner metamerism errors associated with scanning input images using a digital color image scanner, wherein the input images can be on a variety of different input media having colorants with different spectral characteristics, comprising the steps of scanning an input image on a digital color image scanner to produce a scanned image; determining one or more estimated color balance error values in a color balance parameter space by analyzing the scanned image using a color balance analysis algorithm; assigning an input medium from a set of possible input media for the scanned input image responsive to the estimated color balance error values; selecting a scanner metamerism correction color transform associated with the assigned input medium; and applying the scanner metamerism correction color transform to the scanned image to produce a corrected image compensated for scanner metamerism errors.

ADVANTAGES

This invention has the advantage that it can be used to correct for scanner metamerism errors without user intervention. This makes it possible to design systems for scanning images formed on different input media without the need for a cumbersome user interface. It has the additional advantage that it can be implemented using commonly available color balance analysis algorithms.

DETAILED DESCRIPTION OF THE INVENTION

Figure 1:
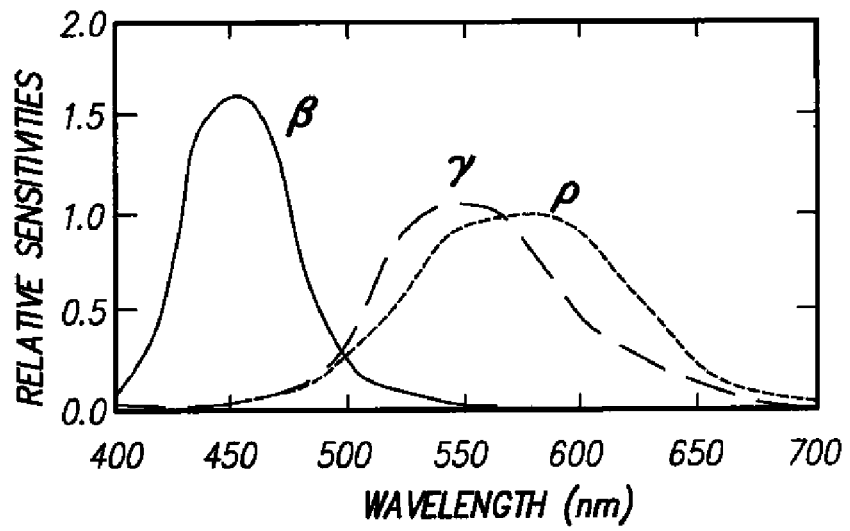
FIG. 1 (Prior Art) is graph showing human spectral sensitivity functions.
Figure 2:
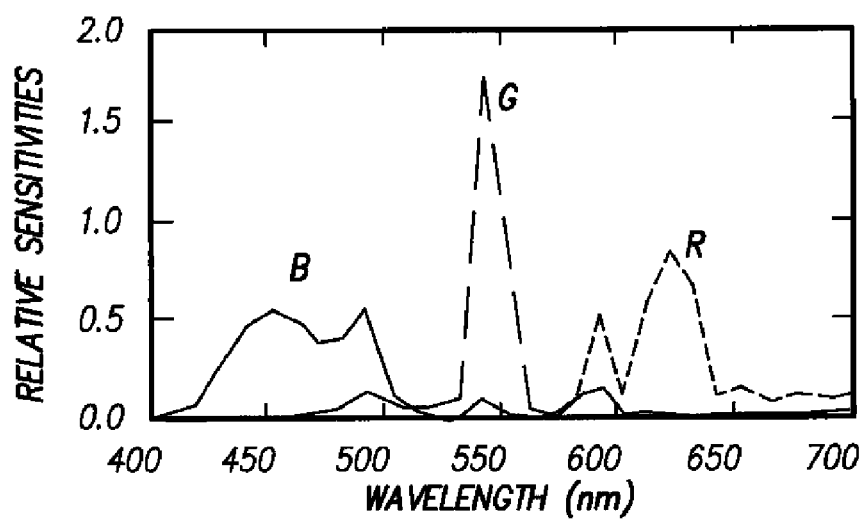
FIG. 2 (Prior Art) is graph showing typical scanner spectral sensitivity functions.
Figure 3:
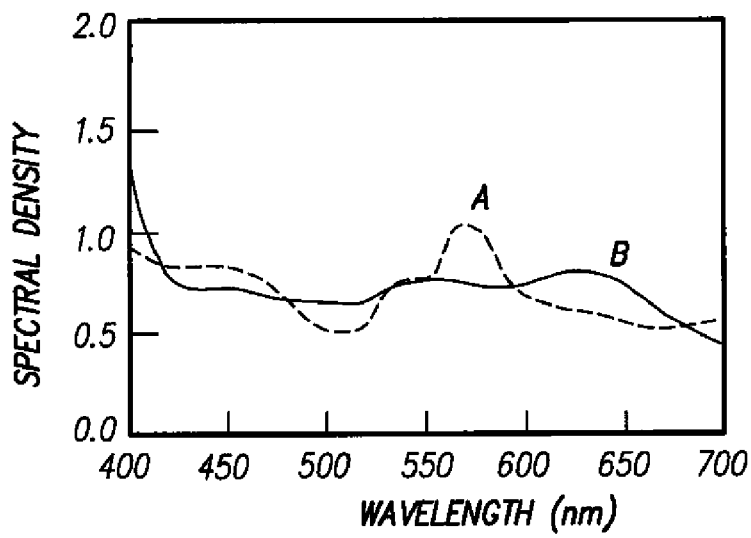
FIG. 3 (Prior Art) is a graph showing spectral reflectance of two metamaric neutral patches.
Figure 4:
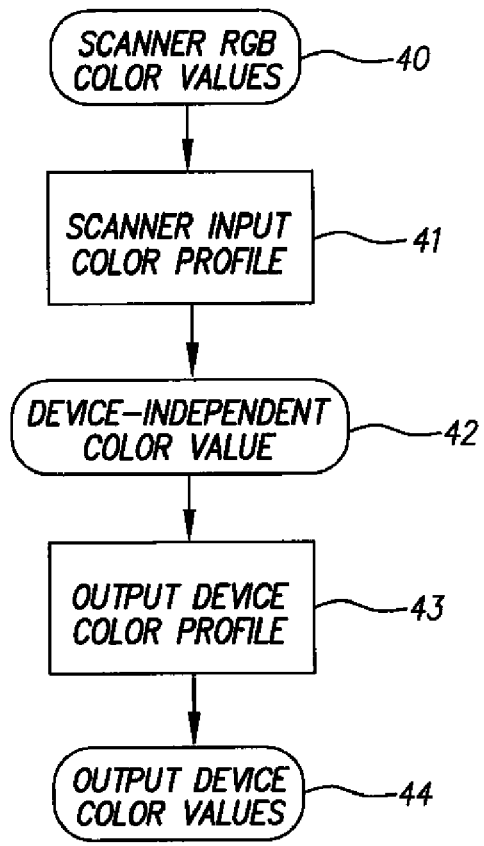
FIG. 4 is a flow diagram showing a typical color management process.
Figure 5:
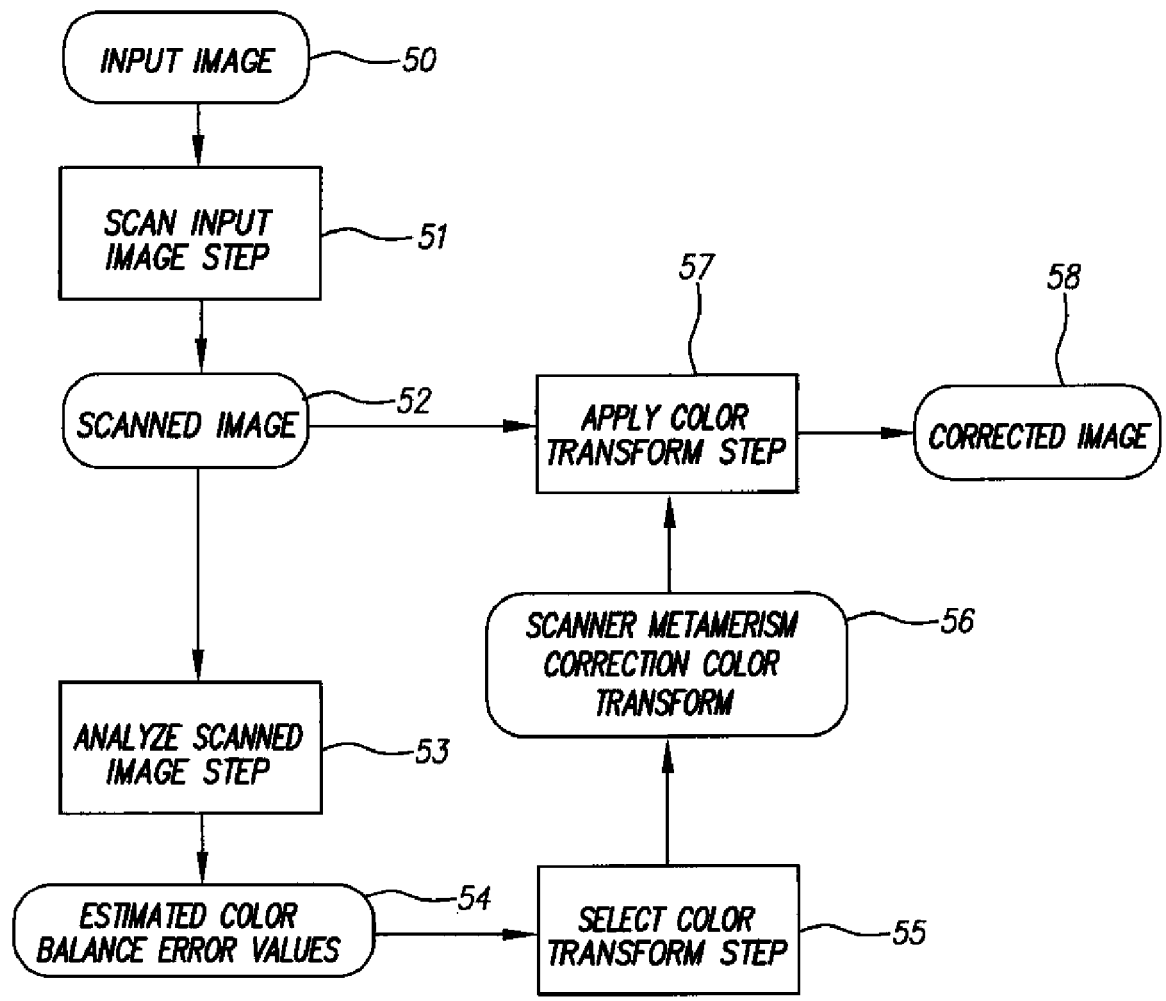
FIG. 5 is a flow diagram showing the method of the present invention.

The method of the present invention will now be described with reference to FIG. 5. An input image 50 is scanned on a digital color image scanner using a scan input image step 51 to produce a scanned image 52. An analyze scanned image step 53 is then used to analyze the scanned image 52 using a color balance analysis algorithm to produce one or more estimated color balance error values 54 in a color balance parameter space. Next, a select color transform step 55 is used to assign an input medium from a set of possible input media for the scanned input image responsive to the estimated color balance error values 54, and select a corresponding scanner metamerism correction color transform 56 associated with the assigned input medium. As used herein, the term input medium refers to the combination of the colorants and the receiver used to form the input image. Different input media will have different spectral characteristics, primarily resulting from differences in the spectral characteristics of the set of colorants used to form the input image. Finally, an apply color transform step 57 is used to apply the scanner metamerism correction color transform 56 to the scanned image 52 to form a corrected image 58 compensated for scanner metamerism errors.

Each of the steps shown in FIG. 5 will now be described in more detail. In a preferred embodiment of the present invention, the digital color image scanner is a reflection print scanner designed to digitize hardcopy reflection prints. However, it should be noted that the method of the present invention is also applicable to other types of scanners such as transparency scanners. There are many different types of reflection print scanners that have been developed and are in common use in the industry. Flatbed reflection print scanners are one common type of digital color image scanner. Commonly, low-cost flatbed reflection print scanners use charge coupled device (CCD) sensors. A number of different optical arrangements are used in this class of scanners, including cold-cathode fluorescent lamp (CCFL) illumination with a folded optics image path, and contact image sensor (CIS) technology using light emitting diode (LED) illumination. The spectral characteristics of the scanner's light source, combined with the spectral sensitivities of the image sensor elements, will determine the effective spectral sensitivity of the digital color image scanner. Generally, the effective spectral sensitivity will not be very close to human color matching functions, particularly for low-cost scanners. Therefore, scanner metamerism color errors can be a significant problem with many different types of input media.

The input image 50 can be on any of a wide range of different types of input media. For example, the input image 50 can be an image printed on an inkjet printer, or an image printed on a conventional photographic silver halide printer. Likewise, the input image 50 could be produced on a wide variety of other printing devices including electrophotographic, thermal dye transfer or graphic arts printing presses. Each of these different image forming devices will generally use a different set of colorants having different spectral reflectance properties. Even within one type of printing technology, devices from different manufacturers, and even different printer models from a single manufacturer, will often make use of different colorant sets. As a result, a non-colorimetric scanner will "see" each of these different input media differently, and therefore two colors which may match to a human observer, may appear different to the scanner.

Digital color image scanners can be used for many different applications. Often, a digital color image scanner can be connected to a digital computer and used to upload a scanned image to the computer for use with a wide variety of applications. For example, the scanned image can be viewed in a "slideshow" on the computer or included in a word processing document. Alternatively, the scanner can store the image directly onto a storage device such as a solid-state memory device or a CDROM. For cases where the scanner is part of an all-in-one scanner/printer device, the scanned image can be used to produce a copy image directly on the associated printer.

When a digital color image scanner scans an input image, the sensor in the digital color image scanner will produce color values in a native scanner color space associated with the spectral sensitivities of the different sensor elements. Typically, the scanner color space will be an RGB color space corresponding to red, green and blue sensor spectral sensitivities. However, other types of encodings are also possible. For example, some scanners use a fourth color channel having a neutral spectral sensitivity. Depending on the scanner architecture, the scanner may leave the image in the native scanner color space, or it may convert the image to a standard color space such as sRGB. In such cases, the color transform used to convert the image will generally be optimized for one particular type of input media. The digital color image scanner can also include a number of other processing steps in its imaging chain. For example, it can apply dark current subtraction, gain correction, defect correction, sharpening or noise reduction.

As discussed earlier, digital color image scanner generally do not utilize sensors having color matching function sensitivities, and therefore scanned images from different input media may not be directly compatible with one another. For example, if a scanner is optimized to scan conventional silver halide photographs, equal RGB values will be produced when a gray patch on that type of input medium is scanned. However, if the scanner is then used to scan an image produced on a particular inkjet printer, a neutral gray patch can have RGB values that are significantly unbalanced. If the spectral characteristics of the particular input medium are known, it is possible to determine a color transform that can be applied to the scanned image 52 to correct for the metamerism errors associated with scanning that particular input medium. However, the input medium is not usually known, and providing a mechanism for the user to select an appropriate color transform is quite cumbersome. As a result, scanner manufacturers usually are forced to optimize the system for the most prevalent input medium and live with the scanner metamerism errors associated with other input media. This can be a significant source of dissatisfaction for the user.

The present invention provides a method to automatically identify the input medium by using a color balance analysis algorithm to analyze the scanned image. This is accomplished using the analyze scanned image step 53. This method makes use of the fact that different input media are often observed to have a characteristic color balance error when scanned on a digital color image scanner. For example, scans of images produced on an inkjet printer having a particular set of colorants may tend to have a magenta color cast, as viewed by the scanner, although not visually perceptible in the scanned image. Therefore, if the scanned image 50 is analyzed and a magenta color cast is identified, then there will be a high probability that the input image 50 was produced on that class of input medium. Generally, images that a user will decide to scan will be high-quality images that do not have any significant color balance errors. Therefore, it can be assumed that any color casts which are detected in the scanned image can be attributed to scanner metamerism errors.

The need to correct for color balance errors in an image is a problem that has existed for many applications for many years. In particular, this is a common problem for the printing of conventional photographic negatives where the images may be captured under a wide variety of illumination conditions, and will introduce a corresponding color cast to the negative which must be removed when the negative is printed in order to produce a pleasing image. A class of algorithms has been developed to analyze input images and estimate any color balance errors for the purpose of determining an appropriate color balance correction that can be applied to produce a pleasing balanced image. These algorithms will be referred to as color balance analysis algorithms. In the art, they are also referred to using other names such as "scene balance algorithms." These algorithms generally work by analyzing the image to estimate the overall color balance of the input image. The estimated overall color balance is then compared to a nominal overall color balance and estimated color balance error values are determined.

There are many different types of color balance analysis algorithms that are available. Typically they are based on the "gray world assumption," which assumes that the colors in a normal scene will average to a neutral. A simple form of a color balance analysis algorithm would be to average all of the pixels in the scanned image to determine an estimated overall color balance. More sophisticated algorithms will weigh the importance of different pixels based on where they are in the image, and the amount of detail in that region of the image. Some color balance analysis algorithms make use of various statistical predictors that are developed by analyzing a large population of typical images.

In the prior art, such color balance analysis algorithms are generally coupled with a corresponding color balance correction method, which will apply some form of color correction to compensate for the estimated color balance errors. In systems for printing conventional photographic negatives using optical printers, the corrections are typically applied by adjusting the color filtration used in the optical printer. In digital imaging systems, the corrections are typically applied by modifying the color of the pixels in the digital image.

The method of the present invention is designed to leverage existing color balance analysis algorithms that have been developed for other applications for use in the analyze scanned image step 53. However, the estimated color balance error values 54 that are produced by the analyze scanned image step 53 are not used to correct the image using a conventional color balance correction method as in the prior art. Rather, the estimated color balance error values 54 are used as an indication of the probable input medium of the input image. This approach relies on the fact that different input media will typically have an associated color cast that results from the metamerism errors associated with the particular combination of colorant spectral properties and scanner spectral sensitivities.

It should be noted that there would be a wide range of different input media that can be scanned on the digital color image scanner. The metamerism characteristics of many different types of input media can be quite similar, and therefore it may not be possible to accurately distinguish the exact input medium from the estimated color balance error values 34. However, if the different input media have similar metamerism characteristics due to similarities in the spectral characteristics of the colorants that are used, it is usually acceptable to use the same color transform to correct for the metamerism errors. Therefore, the fact that the algorithm is unable to precisely identify the exact input medium is not an important limitation.

The analyze scanned image step can be applied directly to the scanned image 52. However, this may require tuning a series of algorithm parameters to be compatible with the native scanner color space. In a preferred embodiment of the present invention, the scanned image is first converted to some standard color space, such as the well-known sRGB color space, before the application of the color balance analysis algorithm. In this case, a standard color balance analysis algorithm can be used without modification to account for the characteristics of each particular scanner. To transform the image to the standard color space, a color space conversion transform can be created for some reference input medium using conventional color management tools. Often, color balance analysis algorithms do not require a high-resolution image to perform their analysis. In such cases, the scanned image can be sub-sampled to a form a low-resolution version before applying the color balance analysis algorithm. The sub-sampling can be done either before or after the image is transformed to a standard color space. It is generally preferable to perform a low-pass filter operation before the downsampling operation to accurately preserve the image statistics.

The output of the analyze scanned image step 53 is a set of estimated color balance error values 54. The estimated color balance error values 54 will typically be comprised of two or three color balance error values, represented in some color balance parameter space. For example, the color balance parameter space may have three numbers representing the color balance errors for red, green and blue color channels. Alternatively, in a preferred embodiment of the present invention, the color balance parameter space is a so-called opponent color space using two color difference color channels to represent the color balance errors. (There can be a third color channel for representing image brightness errors). For the case where the color balance parameter space is an opponent color space, there will generally be one color channel for representing the yellow-blue component of the color balance error, and a second color channel for representing the red-green component of the color balance error.

Figure 6:
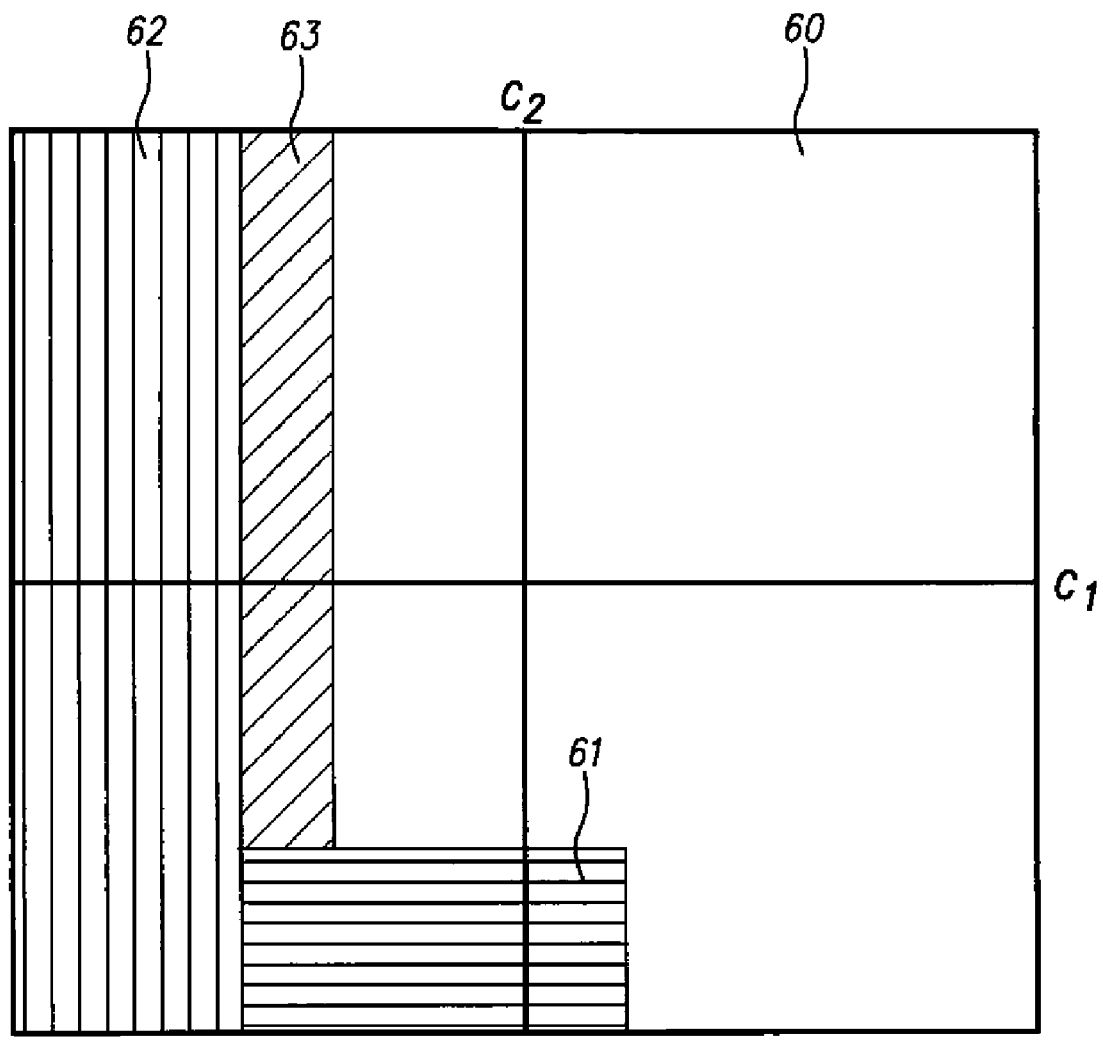
FIG. 6 is diagram illustrating the definition of different regions within a color balance parameter space.

The select color transform step 55 is used to assign an input medium from a set of possible input media for the scanned input image responsive to the estimated color balance error values 54, and select a corresponding scanner metamerism correction color transform 56 associated with the assigned input medium. There are a variety of methods that can be used to assign an input medium for the scanned image 52. In a preferred embodiment of the present invention, the color balance parameter space is segmented into a set of different regions corresponding to the set of possible input media. For example, consider the case where color balance parameter space is an opponent color space having two color difference color channels, a first color channel $C_1$ indicating the red-green component of the estimated color balance error, and a second color channel $C_2$ indicating the blue-yellow component of the estimated color balance error. The color balance parameter space can be subdivided into a series of different regions as shown in FIG. 6, where each of the different regions correspond to one of the possible input media. In this case, a first region 60 is associated with a nominal input medium for which the scanner was optimized. A second region 61 corresponds to a second input medium where the scanner introduces an overall blue color shift to the image, and a third region 62 corresponds to a third input medium where the scanner introduces an overall red color shift to the image.

The set of possible input media can include two possible input media, or a more extensive set. It might also include some intermediate input medium corresponding to a hypothetical input medium with characteristics intermediate to two or more input media. This will allow the correction to change less abruptly between the different regions. This can also make the method more robust to classification errors where the wrong input medium is assigned to the scanned image. For example, in FIG. 6, there is shown an intermediate region 63 corresponding to a hypothetical input medium with characteristics intermediate to the nominal input medium and the third input medium.

The different regions of the color balance parameter space can be determined using a variety of different methods. One method for accomplishing this task is by analyzing scans of neutral patches generated on each of the different input media. This can provide information about any color casts that are introduced by metamerism errors. Regions of the color balance parameter space can then be defined corresponding to the color casts for each of the input media. In some cases where multiple input media show similar color casts, they can be grouped into a single region.

In a preferred embodiment of the present invention, the regions of the color balance parameter space to be associated with each of the different input media are determined by analyzing a set of representative scanned images from each of the different input media using the color balance algorithm. The resulting distributions of the estimated color balance error values can then be used to guide the definition of the different regions. In many cases, regions can be defined by visually examining the resulting distributions. Alternatively, more sophisticated statistical methods can also be used to define the different regions from the resulting distributions. If the spectral characteristics of the colorants for the different input media are known, the color casts can be predicted from a knowledge of the sensor spectral sensitivities without the need to prepare and scan actual samples.

An input medium can be assigned to a scanned image by determining which of the defined regions of the color balance parameter space contain the estimated color balance error values 54 that were determined using the color balance analysis algorithm.

Once an input medium is identified for the scanned image 52, a scanner metamerism correction color transform 56 is selected corresponding to the assigned input medium. The scanner metamerism correction color transform 56 is designed to compensate for the scanner metamerism errors introduced by scanning input media other than the nominal input medium for which the scanner was optimized. The selected scanner metamerism correction color transform 56 is then applied to the scanned image 52 using the apply color transform step 55 to produce a corrected image 58.

In a baseline configuration, the scanner metamerism correction color transform 56 is applied directly to the scanned image 52. In alternate configurations, the scanned image 52 is first transformed to an intermediate color space (e.g., sRGB) before the scanner metamerism correction color transform 56 is applied. The scanner metamerism correction color transform 56 can either leave the scanned image 52 in it's original color space, simply correcting for the metamerism errors associated with scanning the identified input medium, or it can transform the scanned image to some other color space. For example, the scanner metamerism correction color transform 56 could be an ICC color management profile that converts the image to the L*a*b* profile connection space. Or the scanner metamerism correction color transform 56 can transform the image directly to a desired output color space such as sRGB. For the case where the digital color image scanner is a component of an image copy path, such as when it is used in an all-in-one combination scanner/printer device, it may be desirable for the scanner metamerism correction color transform 56 to transform the scanned image to the printer color space so that it is ready to be printed.

Often, the conversion to an intermediate color space can introduce undesirable artifacts such as quantization or contouring. An alternate configuration uses the information an initial low resolution pre-scan of the input image for the analyze scanned image step in order to determine the scanner metamerism correction color transform required. A second scan full resolution scan is then performed to which the apply color transform step is performed. Alternately the initial scan may be a full resolution scan of the input image and a second scan performed only if the analyze scanned image step determines that correction is required. Otherwise, the initial scan image can be used without application of the apply color transform step.

The scanner metamerism correction color transform 56 can take many different forms. In its simplest form, the scanner metamerism correction color transform 56 can be a set of scale values which are used to scale each color channel of the scanned image 52. Alternatively, the scanner metamerism correction color transform 56 can utilize one-dimensional look-up tables that are applied to each color channel of the scanned image 52. These mechanisms can be used to remove any overall color casts introduced by the metamerism errors. To correct for the more complex color distortions that can be associated with scanner metamerism errors, it is advantageous to use more sophisticated types of color transforms such as matrix transforms and three-dimensional look-up tables. Methods for building such transforms are well known by those skilled in color science.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

40 scanner RGB color values
41 scanner input color profile
42 device independent color profile
43 output device color profile
44 output device color values
50 input image
51 scan input image step
52 scanned image
53 analyze scanned image step
54 estimated color balance error values
55 select color transform step
56 scanner metamerism correction color transform
57 apply color transform step
58 corrected image
60 first region
61 second region
62 third region
63 intermediate region

The invention claimed is:

1. A method for automatically compensating for scanner metamerism errors associated with scanning input images using a digital color image scanner, wherein the input images can be on a variety of different input media having colorants with different spectral characteristics, comprising:
   a) scanning an input image on a digital color image scanner to produce a scanned image;
   b) determining one or more estimated color balance error values in a color balance parameter space by analyzing the scanned image using a color balance analysis algorithm;
   c) assigning an input medium from a set of possible input media for the scanned input image in response to the estimated color balance error values;
   d) selecting a scanner metamerism correction color transform associated with the assigned input medium; and
   e) applying the selected scanner metamerism correction color transform to the scanned image to produce a corrected image compensated for scanner metamerism errors.

2. The method of claim 1 wherein the digital color image scanner is a reflection print scanner.

3. The method of claim 1 wherein the digital color image scanner is a transparency scanner.

4. The method of claim 1 wherein the set of possible input media includes at least one input medium produced by an inkjet printer.

5. The method of claim 1 wherein the color balance analysis algorithm estimates the overall color balance of the scanned image.

6. The method of claim 5 wherein the estimated color balance error values are determined by computing a difference between the estimated overall color balance of the scanned image and a nominal overall color balance.

7. The method of claim 1 wherein different input media are associated with different regions of the color balance parameter space.

8. The method of claim 7 wherein an input medium is assigned by determining which region of the color balance parameter space contains the estimated color balance error values.

9. The method of claim 7 wherein the regions of the color balance parameter space to be associated with each of the different input media are determined by analyzing a set of representative scanned images from each of the different input media using the color balance analysis algorithm.

10. The method of claim 7 wherein the regions of the color balance parameter space to be associated with each of the different input media are determined by analyzing scans of neutral patches generated on the different input media.

11. The method of claim 7 wherein the regions of the color balance parameter space to be associated with each of the different input media are determined from the spectral characteristics of the different input media.

12. The method of claim 1 wherein the color balance analysis algorithm is applied directly to the scanned image.

13. The method of claim 1 wherein the scanned image is transformed to a reference color space before the color balance analysis algorithm is applied.

14. The method of claim 1 wherein an initial scanned image is acquired for the analysis and a subsequent scanned image is acquired to which the color transform is applied.

15. The method of claim 1 wherein the scanner metamerism correction color transform includes a set of one-dimensional look-up tables.

16. The method of claim 1 wherein the scanner metamerism correction color transform includes a three-dimensional look-up table.

17. The method of claim 1 wherein the scanner metamerism correction color transform is applied directly to the scanned image.

18. The method of claim 1 wherein the scanned image is transformed to an intermediate color space before the scanner metamerism correction color transform is applied.

* * * * *